Oct. 1, 1968   A. W. BARRY ET AL   3,403,656
POINTER LOCKING MECHANISMS FOR EXPOSURE METERS AND THE LIKE
Original Filed April 11, 1961   2 Sheets-Sheet 2

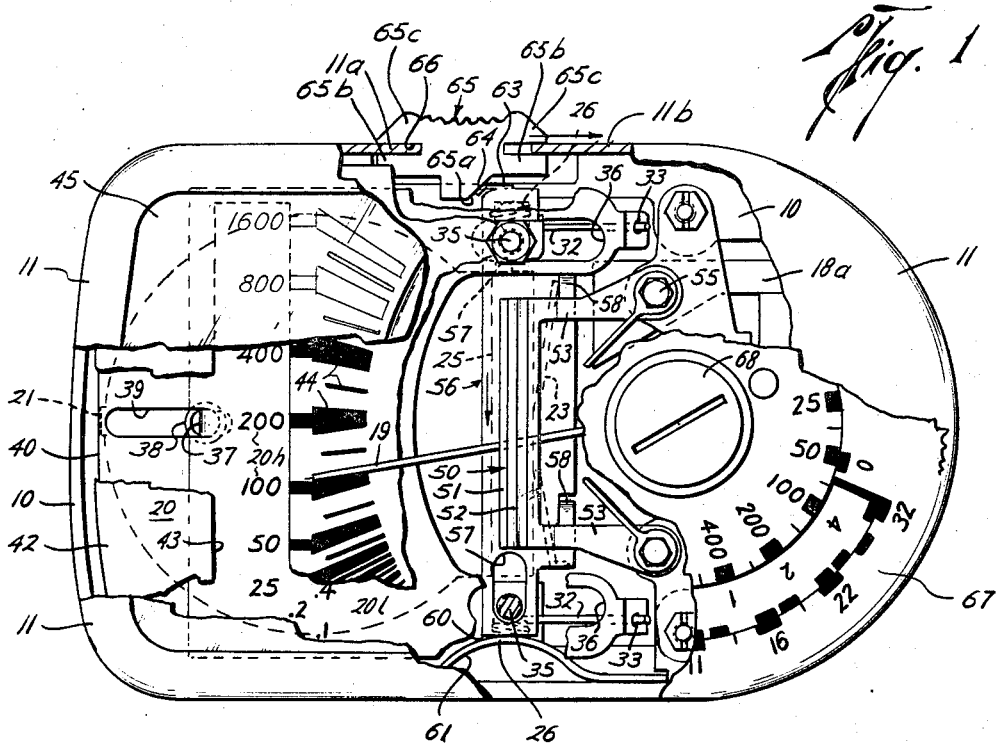

Austin W. Barry
Richard P. Schake
INVENTORS

BY *Michael P. Breston*

ATTORNEY

United States Patent Office 3,403,656
Patented Oct. 1, 1968

3,403,656
POINTER LOCKING MECHANISMS FOR
EXPOSURE METERS AND THE LIKE
Austin W. Barry, Fanwood, and Richard P. Schake, Livingston, N.J., assignors to Weston Instruments, Inc., a corporation of Texas
Original application Apr. 11, 1961, Ser. No. 102,267, now Patent No. 3,170,023. Divided and this application Oct. 28, 1964, Ser. No. 407,261
1 Claim. (Cl. 116—129)

This invention relates to photometers and in particular to brightness or exposure meters commonly used for determining exposure data for photographic purposes. This application is a division of copending application, Ser. No. 102,267 filed Apr. 11, 1961 and entitled "Double Range Exposure Meter," now Patent No. 3,170,023.

The invention contemplates a photographic exposure meter which features an improved pointer lock arrangement which eliminates prior art disadvantages in meters having this feature. The invention is particularly useful with meters of the photoelectric type such as that described and claimed in Patent No. 2,274,441 to Alexander T. Williams but is not restricted to meters of this type.

Specifically, it is an object to provide a photographic exposure meter having an improved pointer locking mechanism which is adapted for maintaining the meter pointer or needle in either a free or a locked condition depending upon the position of a pointer lock actuating member and which does not require continuing pressure on such member to maintain the pointer in either condition.

Figure 3:
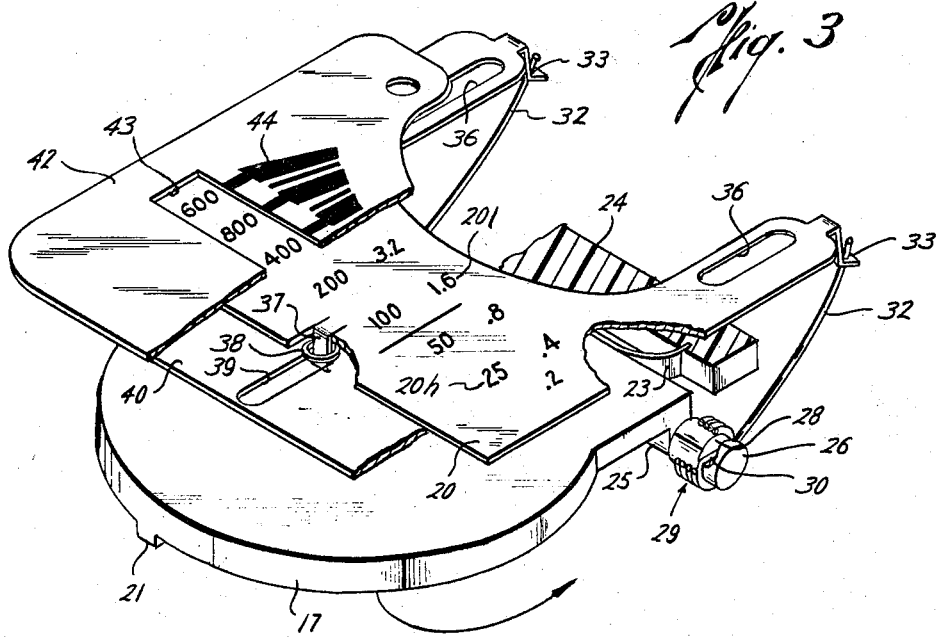
Figure 4:
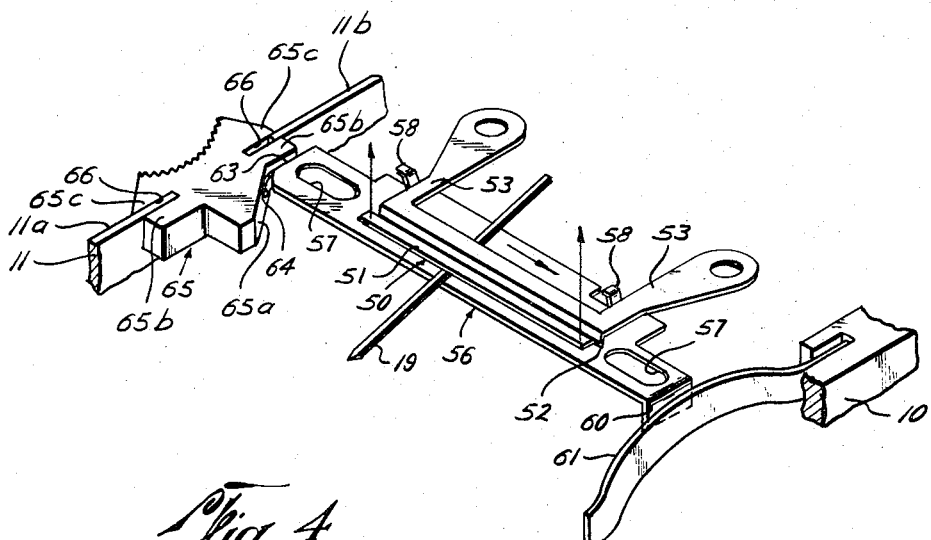

Other objects, features, and advantages of the invention will become apparent from a study of the following detailed description taken in conjunction with the claim and the drawings in which:

FIGURE 1 is a plan view, with parts broken away, of an exposure meter embodying our invention, FIGURE 2 is a side view, also with parts broken away, of the meter shown in FIGURE 1, FIGURE 3 is a perspective view showing the auxiliary baffle and movable scale plate feature employed with the meter, and FIGURE 4 is a perspective view showing the elements comprising the pointer locking mechanism.

Referring now to the drawings, the reference numeral 10 indicates an elongated molded form which serves as a base upon which various parts of the exposure meter are mounted. The upper portion of the base is recessed about its periphery to accommodate a top cover plate 11, and a back cover plate 12 is affixed to the base such as by a pair of screws 13. A photoelectric cell 14 is secured to the base and a fixed multi-lens baffle system is disposed adjacent the photocell and comprises a multiple lens plate 15 with a multiple compartment baffle 16. An auxiliary movable apertured baffle 17 of opaque material is provided on the external side of the lens plate 15, details of which will be discussed hereinafter.

A movable coil indicating instrument is provided for cooperating with the photocell 14 and comprises a pivotally supported coil 18 which is angularly movable between the poles of a permanent magnet 18a and carries a pointer 19 which is actuated upon exposure of the photocell to light energy.

The meter is adapted for measuring wide variations of brightness by an arrangement which includes the movable baffle 17 in cooperation with a sliding scale plate 20 which is adapted to remain in a lower position when the baffle is closed to bring into view a high brightness scale 20H, and also to remain in an upper position when the baffle is open to bring into view a low brightness scale 20L, both scales being provided on the front face of the plate 20.

The movable baffle 17 is adapted to be maintained in its closed position by means of a latch type protrusion 21 formed on the baffle and a cooperating recess 22 in the base 10. A leaf spring 23, positioned against a bridge member 24 on the base 10, urges the baffle 17 in an upward direction longitudinal of the base to insure positive cooperation between the latch 21 and recess 22.

The lower portion of the movable baffle 17 includes a shaft-like portion 25 having ends 26 which are adapted to rotate in bearing-like supports 27 formed in the base 10. The outer portions of the shaft ends 26 have flat portions or notches 28 formed thereon and a spiral spring 29 is received over each end, each spring having a straight terminal portion 30 for cooperating with the flat portion 28 to transfer torque produced by angular movement of the baffle 17 from the shaft ends 26 to the springs to thereby urge the elongated spring ends 32 on each spring 29 in a given direction in accordance with the movement of the baffle 17. The ends 32 are received in apertures 33 in the movable plate 20 to impart motion to this plate.

The plate 20 is guided for rectilinear movement at its lower end by a pair of pins or screws 35 in cooperation with elongated slots 36 in the plate, and at its upper end by a bent-over tab 37 on the plate in cooperation with a washer 38 and an elongated slot 39 in a stationary plate 40 behind the plate 20. The slidable plate 20 is positioned between the stationary plate 40 and a scale plate 42, the latter being provided with a rectangular window 43 for viewing either the higher scale 20H or lower scale 20L, each of which is selectively presented in the window in accordance with a closed or open position of the baffle 17 as will appear. Scale division markings 44 are provided on the scale plate 42 for cooperating with the numbers comprising the scales 20H and 20L on the movable plate 20. As is conventional, a glass window 45 is provided and is appropriately sealed at its rim of contact with the inner surface of the cover plate 11 to keep out dust and other foreign matter.

Referring now particularly to FIGURE 3, the important functional elements of the baffle-sliding scale mechanism are shown, with the movable baffle 17 represented in the closed position. When it is in this position, the sliding scale plate 20 is held in its lower position by the springs 29, which are then in a biased condition, so that the high brightness scale 20H is presented through the window 43. When, however, it is desired to use the low brightness scale 20L, the movable baffle is unlatched by means of the knob 46 and rotated about the shaft-like portion 25 in the direction of the curved arrows in FIGURES 2 and 3 to the full open position and can be latched in this position by depressing the baffle until the head of the knob passes through an aperture 47 in the back cover plate 12 and engages the underside thereof. The leaf spring 23 will maintain pressure between the knob 46 and the wall of the aperture 47 to hold the baffle in this full open position.

During the rotation of the baffle 17 from the closed position, the springs 29 will first assume an unbiased condition at some point approximately midway between the closed and full open position. As the baffle is further rotated to the full open position, the torque produced thereby will be transmitted to the spiral springs 29, causing the spring ends 32 to move the slidable plate 20 to the upward position, which will bring the lower brightness scale 20L into view through the window 43. The spiral springs will be in a reverse-biased condition as compared with their biased condition when the baffle 17 is closed. When it is necessary or desirable to again use the high brightness scale, the baffle 17 is closed and the sliding scale is thereby moved to its lower position. This is accomplished simply by releasing the baffle from its open-locked position by pressing the baffle downwardly in a direction longitudinal to the meter casing against the pressure of the leaf spring 23, so that the head of the knob 46 will be moved outwardly through the aperture 47 by the force of the springs 29 which are then in the reverse-biased condition. As in the case when the baffle 17 is first opened, the springs 29 now also assume an unbiased condition when the baffle is approximately midway between the full open and the closed positions, and then wind up biased in the opposite direction, driving the plate 20 until the high brightness scale 20H is again displayed. Rotation of the baffle 17 is, of course, continued until it is latched in the closed position. It is to be observed that positive spring driving action actuates the movement of the plate 20 in both directions.

The meter further includes a pointer locking or position retaining mechanism for maintaining the pointer in the position it takes as a result of the measurement of a particular brightness scene. Referring particularly now to FIGURE 4 and also to FIGURES 1 and 2, it will be seen that the pointer locking mechanism includes a pointer depressing bar 50 of resilient material having an elongated portion 51 which includes a V-shaped portion 52 when viewed in cross-section and terminating in legs 53 which are secured firmly in position with respect to the base 10 by any suitable means such as for example the screws 55.

An actuating bar 56 is provided beneath the pointer depressing bar 50 and pointer 19 and is adapted for guided movement in a direction generally longitudinal to the direction of movement of the pointer 19 by means of slots 57 in cooperation with the pins 35. Movement of the bar 56 in the direction indicated in FIGURE 4 causes a pair of sloping raised portions or cams 58 to cooperate with the legs 53 of the bar 50 for raising this bar. The bar 56 also includes a bent-over portion 60 at its left end against which a leaf spring 61 is biased for urging the bar 56 in a direction away from the spring. The right end of the bar 56 also has a bent-over lip which comprises a main portion 63 and a tab 64 for cooperating with a cam or raised portion 65a of a manually operable movable member 65. This member comprises an inner portion 65b to which the cam 65a is attached, and an outer portion 65c, these two portions being separated at opposite ends of the member by slots 66 for slidably engaging the side of the top cover plate 11 in the regions 11a and 11b to allow movement of the member 65 in a direction generally transverse to the direction of movement of the pointer 19.

As the manually operable member 65 is moved toward the operator to the pointer unlocked position, the cam 65a engages the tab 64 on the actuating bar 56 to move the actuating bar 56 against the pressure of the spring 61, causing the sloping raised portions 58 on the bar 56 to engage the legs 53 on the pointer depressing bar 50, thereby holding it in a biased condition and out of contact with the pointer 19 to allow free movement of the pointer in accordance with the brightness of the scene to be photographed. This condition is represented by the broken outlines of the pointer 19 and bar 50 shown in FIGURE 2. When the pointer has stopped at the position indicating the brightness of the scene, it can be locked or frozen in this position by moving the manually operable member in the direction away from the operator, i.e., to the position in which it is shown in FIGURES 1 and 4. This causes the cam 65a on the member 65 to be moved out of the position of engagement with the lip 63–64 allowing the leaf spring 61 to move the actuating bar in the direction of the member 65, thus moving the cam portions 58 out of contact with the legs 53 to allow them to assume a less biased condition, thereby allowing the V-shaped portion 52 of the pointer depressing bar 50 to contact the pointer 19 to lock or "freeze" it in position. The mechanism is shown in this condition in FIGURE 4. As a result the brightness reading of the particular scene to be photographed need not be remembered by the operator but can be read directly as long as the pointer is not released. The operator can then refer to this brightness value and calculate the correct setting for his camera by means of the computer 67 secured by the screw 68 to the lower portion of the meter. It will be appreciated from the foregoing that no manual pressure is required either to hold the member in the lower position to maintain the pointer in the freely movable condition or in the upper position to maintain the pointer in the locked condition.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A meter including a housing, an indicator and an instrument movement mounted in said housing and coupled to said indicator, said movement being responsive to a measured parameter for causing corresponding movement of said indicator, first and second members mounted in spaced-apart relationship for receiving therebetween a portion of said indicator, the first member mounted for movement in the general direction of movement of said indicator to respective first and second positions and the second member mounted for movement into and out of restraining engagement with said indicator, and means coupling said first and second members for driving said second member from restraining engagement with said indicator when said first member is moved to the second position, wherein the improvement comprises: a device mounted for slidable movement on said housing in directions transverse to the direction of movement of said indicator and having portions thereof which project interiorly and exteriorly of said housing, a cam lobe formed on the interior portion of said device for driving said first member from said first to said second position when said device is moved a given distance in one directon, said cam lobe retaining said first member in said second position until said device is moved a given distance in a direction opposite said one direction, said cam lobe comprising two step surfaces lying in planes substantially perpendicular to the directions of movement of said first member and a ramp surface joining said two step surfaces and lying in a plane inclined in said direction opposite said one direction of device movement.

References Cited

UNITED STATES PATENTS

| | | | |
|---|---|---|---|
| 2,408,944 | 10/1946 | Miller | 88—23 |
| 2,471,171 | 5/1949 | Stimson | 88—23 |
| 2,648,254 | 8/1953 | Stimson et al. | 88—23 |
| 2,982,190 | 5/1961 | Fischer | 88—23 |

JEWELL H. PEDERSEN, *Primary Examiner.*

W. A. SKLAR, *Assistant Examiner.*